US006998601B2

(12) United States Patent
Chin et al.

(10) Patent No.: US 6,998,601 B2
(45) Date of Patent: Feb. 14, 2006

(54) DUAL-AXIS OPTICAL ENCODER DEVICE

(75) Inventors: Yee Loong Chin, Perak (MY); Siang Leong Foo, Penang (MY)

(73) Assignee: Agilent Technologies, Inc., Palo Alto, CA (US)

( * ) Notice: Subject to any disclaimer, the term of this patent is extended or adjusted under 35 U.S.C. 154(b) by 156 days.

(21) Appl. No.: 10/369,942

(22) Filed: Feb. 20, 2003

(65) Prior Publication Data

US 2003/0193016 A1 Oct. 16, 2003

(30) Foreign Application Priority Data

Apr. 11, 2002 (MY) .............................. PI20021342

(51) Int. Cl.
   *G01D 5/34* (2006.01)
(52) U.S. Cl. ................... 250/231.13; 356/615
(58) Field of Classification Search .......... 250/231.13, 250/231.14, 231.15, 237 R, 559.29; 356/139, 356/615–617; 341/9, 13
   See application file for complete search history.

(56) References Cited

U.S. PATENT DOCUMENTS

| | | | | |
|---|---|---|---|---|
| 5,729,007 A | * | 3/1998 | Taniguchi et al. | 250/231.13 |
| 5,932,874 A | * | 8/1999 | Legg et al. | 250/231.13 |
| 6,104,023 A | * | 8/2000 | Maeda | 250/231.13 |
| 6,232,885 B1 | * | 5/2001 | Ridenour et al. | 340/870.02 |
| 6,278,107 B1 | * | 8/2001 | Gaumet | 250/231.13 |
| 6,797,636 B2 | * | 9/2004 | Tews et al. | 438/706 |
| 6,803,560 B1 | * | 10/2004 | Okumura et al. | 250/231.16 |

* cited by examiner

*Primary Examiner*—David Porta
*Assistant Examiner*—Davienne Monbleau

(57) ABSTRACT

A dual-axis optical encoder device is disclosed. The optical encoder includes a substrate having a first surface and a second surface opposite the first surface and a first optical encoder on the first surface of a substrate and a second optical encoder on the second surface of the substrate. Each optical encoder includes an optical emitter and an optical detector. The dual-axis optical encoder device provides, within a single device, the ability to acquire movement information on two different axes.

12 Claims, 10 Drawing Sheets

DUAL-AXIS OPTICAL ENCODER DEVICE

The present invention relates to an optical encoder device for dual-axis encoding applications.

A dual-axis encoding application refers to an application where information of a motion on two different axes are acquired and processed. An example of such dual-axis encoding application can be found in a printer. The position of the printer head of the printer with respect to a print medium can be tracked by obtaining the position of the roller which feeds the print medium into the printer, and the position of the printer head in the printer. The position of the roller can be obtained by monitoring the amount of rotation of the roller about an axis, and the position of the printer head in the printer can be obtained by monitoring the movement of the printer head along another axis in the printer. By obtaining the information from these two axes, the position of the printer head with respect to the print medium can thus be obtained. A dual-axis optical encoder device used in this specification shall be used to refer to the optical encoder device for dual axis encoding application according to the invention.

An encoder is a device that provides feedback to a closed loop system. The encoder enables a signal interpretation such as to obtain information on a position, velocity, an acceleration and/or the like when the encoder works in pair with a codewheel or a codestrip. Codewheels are generally used for detecting the rotation motion, for example of the paper feeder drum in a printer or a copy machine, while codestrips are used for detecting the linear motion, for example of the print head of the printer.

Usually, the motion of the codewheel or the codestrip is detected optically by means of an optical emitter and an optical detector. Therefore, the encoder is usually an optical encoder. The optical emitter emits light in a light emission direction towards the codewheel/codestrip. The codewheel/codestrip comprises a regular pattern of slots and bars. According to the position of the slots and bars, relative to the light emission direction, the codewheel/codestrip permits, reflects or prevents light from passing through. The optical detector detects the light that is transmitted or reflected by the codewheel/codestrip and provide an unambiguous information on the motion of the codewheel/codestrip based on the detected light signal.

Optical encoders are generally classified into transmission-based optical encoders and reflection-based encoders.

FIG. 1 shows a typical transmission-based optical encoder 100. The encoder 100 comprises an optical emitter 101 and an optical detector 102 in a housing material 104. An optical lens 106 is provided in the housing material 104 directly below the optical emitter 101 to collimate light emitted by the optical emitter 101 into parallel light 105. A free area 107 is provided between the optical emitter 101 and the optical detector 102 and a codewheel/codestrip 103 is free to rotate or move inside the free area 107. The light emitted by the optical emitter 101 is collimated by the optical lens 106, transmitted through the free area 107 and the codewheel/codestrip 103 and detected by the optical detector 102.

A typical reflection-based optical encoder is shown in FIG. 2. The encoder 200 has an optical emitter 201 and an optical detector 202 mounted on a leadframe 207, which are encapsulated in an expoxy optical element 204. The optical element 204 has two dome-shaped surfaces, with the first dome-shaped surface 205 directly above the optical emitter 201 and the second dome-shaped surface 206 directly above the optical detector 202. The codewheel/codestrip 203 is placed outside the optical element 204, above the dome-shaped surfaces 205, 206. The light emitted by the optical emitter 201 is transmitted through the dome-shaped surface 205 and is concentrated or collimated by the surface 205 into parallel light 208, reflected by the codewheel/codestrip 203, transmitted through the dome-shaped surface 206, and is converged by the surface 206 to the optical detector 202.

The described optical encoders are only able to provide information on a single axis, i.e. for single-axis encoding applications. For example, an optical encoder can be used with a codewheel connected to a roller of a printer to determine the position of the paper in the printer. To determine the position of the printer head of the printer with respect to the paper, a separate optical encoder to be used with a codestrip is needed. Therefore, for dual axis encoding applications like the printer or for tracking the position of a mouse of a computer, two encoders are required, resulting in a higher number of processes, piece parts and a larger operational space.

SUMMARY OF THE INVENTION

It is thus an object of the invention to provide an optical encoder device that can simplify the manufacturing operations, reduce the number of processes, minimize the number of piece parts and minimize the operational space for dual-axis encoding applications.

The object is achieved by a dual-axis encoder device which comprises a first optical encoder on a first surface of a substrate and a second optical encoder on a second surface of the substrate, wherein an optical emitter-detector pair of the first optical encoder and an optical emitter-detector pair of the second optical encoder are mounted on the first surface and the second surface of the substrate, respectively.

In the dual-axis optical encoder device according to the invention, a codewheel/codestrip can work in pair with the first optical encoder to provide feedback information on one axis of the dual-axis encoding application, and another codewheel/codestrip can work in pair with the second optical encoder to provide feedback information on another axis of the dual-axis encoding application. The codewheel/codestrips of the first and second optical encoders of the dual-axis encoder device are coupled indirectly by external devices to the two axes of the dual-axis encoding application of the dual-axis encoding application that transform the direction of movement or rotation of the two axes into the direction and rotation of the codewheel/codestrips.

Therefore, in the dual-axis encoding device according to the invention, two optical encoders originally required for the dual-axis encoding application are integrated into a single encoder and therefore, the space required for encoder mounting and encoding operation is reduced.

A further advantage of integrating two separate optical encoders into a dual-axis optical encoder device for dual axis encoding applications is that fewer piece parts are required. The manufacturing operations, and hence the product cost for the device is also reduced since two separate encoders can be merged into one.

The substrate used may be a leadframe, an insert-molded leadframe, a double-sided printed circuit board (PCB), a ceramic substrate or a micro-interconnected device (MID) wherein the optical emitter and the optical detector can be mounted on both the first surface, for example a top surface, and the second surface, for example a bottom surface, of the substrate. A flat substrate is preferred as it gives a more compact design of the dual-axis optical encoder device according to the invention. Therefore, a leadframe is used as the substrate in the preferred embodiment of the invention, as it is slimmer compared to the other types of substrates, resulting in a smaller and more compact dual-axis optical encoder device. A leadframe substrate is also less expensive compared to the other types of substrate.

In the preferred embodiment of the invention, the optical emitter-detector pair of both the first optical encoder and the second optical encoder are arranged in a parallel direction on the first and second surface of the substrate, respectively. The direction of the optical emitter and optical detector pair is defined as the line intersecting both the optical emitter and the optical detector. Also, the optical emitter-detector pair of the first optical encoder on the first surface of the substrate is arranged such that it is directly above the optical emitter-detector pair of the second optical encoder on the second surface of the substrate. This arrangement allows a highest compact design of the dual-axis optical encoder device according to the invention.

The light emitted by the optical emitter follows an optical path from the optical emitter to the optical detector of the same optical emitter-detector pair. An optical element, which is a 3-dimensional epoxy encapsulation is provided for enclosing both the optical emitter-detector pair. The optical element has two internal reflecting surfaces arranged such that the light emitted by the optical emitter is reflected by the first surface to the second surface of the optical element, and is further reflected by the second surface of the optical element to the optical detector. Therefore, the optical element is used to control the optical path so that the optical path stays within the optical element, and is substantially U-shaped. In this way, the size of the dual-axis encoder device according to the invention is limited to the height of the optical element on the substrate, resulting in a more compact device.

In the preferred embodiment of the invention, a free area is provided in the optical element between the optical detector and the second internal reflecting surface for accommodating a codewheel/codestrip. This arrangement ensures that the encoder is maintained in its compact size and do not extend beyond and above the encoder device. Also in this embodiment, the codewheel/codestrip is nearer to the optical detector and therefore, optical diffractions and the response time to the movement of the codewheel/codestrip are reduced.

Alternative embodiments are possible for the free area for accommodating the codewheel/codestrip to be provided between the first surface and the second surface, resulting the orientation of the codewheel/codestrip to differ from the preferred embodiment. This alternative embodiment may be suitable if it is more convenient to arrange at least one of the codewheel/codestrip of the first and second optical encoders in a different orientation from the preferred embodiment when the size or compactness of the dual-axis optical encoder device is not of great importance.

It should be noted that alternative embodiments for the dual-axis according to the invention are also possible by using different design configurations for the first and/or second optical encoders on the first and second surface of the substrate, respectively. For example, the dual-axis optical encoder device allows the flexibility of using the reflection-based encoder as described in FIG. 2 as the first and/or second optical encoder. However, using the reflection-based encoder described in FIG. 2 for the first and/or second optical encoder in the dual-axis encoder device will result in the device to be less compact, and the size of the device will be extended beyond the optical element to the codewheel/codestrip which is positioned outside and above the optical element. Furthermore, the reflection-based encoder does not perform as well because part of the optical path of the light in the reflection-based encoder is outside the optical element, and hence more susceptible to external environment factors, like vibrations, that may cause the distance or the alignment between the codewheel/codestrip and the optical element to fluctuate.

The dual-axis optical encoder device according to the invention also provides the flexibility of allowing the optical emitter-detector pair of the first optical encoder and the second encoder to be arranged on the substrate in different directions with respect to each other in further alternative embodiments. Such arrangement, although compromising on the compactness of the device, is necessary for example when the circuitries present on the substrate are arranged such that the first and second optical encoders are not able to be arranged in the same direction.

The other features and advantages of the invention will become apparent from the following descriptions of the preferred and alternative embodiments and the appended claims, taken in conjunction with the accompanying drawings in which like parts or elements are denoted by like reference numbers.

DETAILED DESCRIPTION OF THE INVENTION

The preferred embodiment and other alternative embodiments of the invention will now be described in details with the accompanying drawings.

According to the invention, a dual-axis optical encoder device is proposed, wherein two optical encoders are integrated on a single substrate. A first optical emitter and detector pair belonging to a first optical encoder are mounted on a first surface of a substrate, and a second optical emitter and detector pair belonging to a second optical encoder are mounted on a second surface of the substrate.

The substrate is preferably flat, has two surfaces for the optical emitter and detector pair of the first and second optical encoder to be mounted on. The substrate may be a leadframe, an insert-molded leadframe, a double-side PCB, a ceramic substrate or a micro-interconnecting device, wherein an optical encoder can be mounted on each side. In the preferred embodiment of the invention, a leadframe which is essential flat, is used as the substrate.

Figure 3:
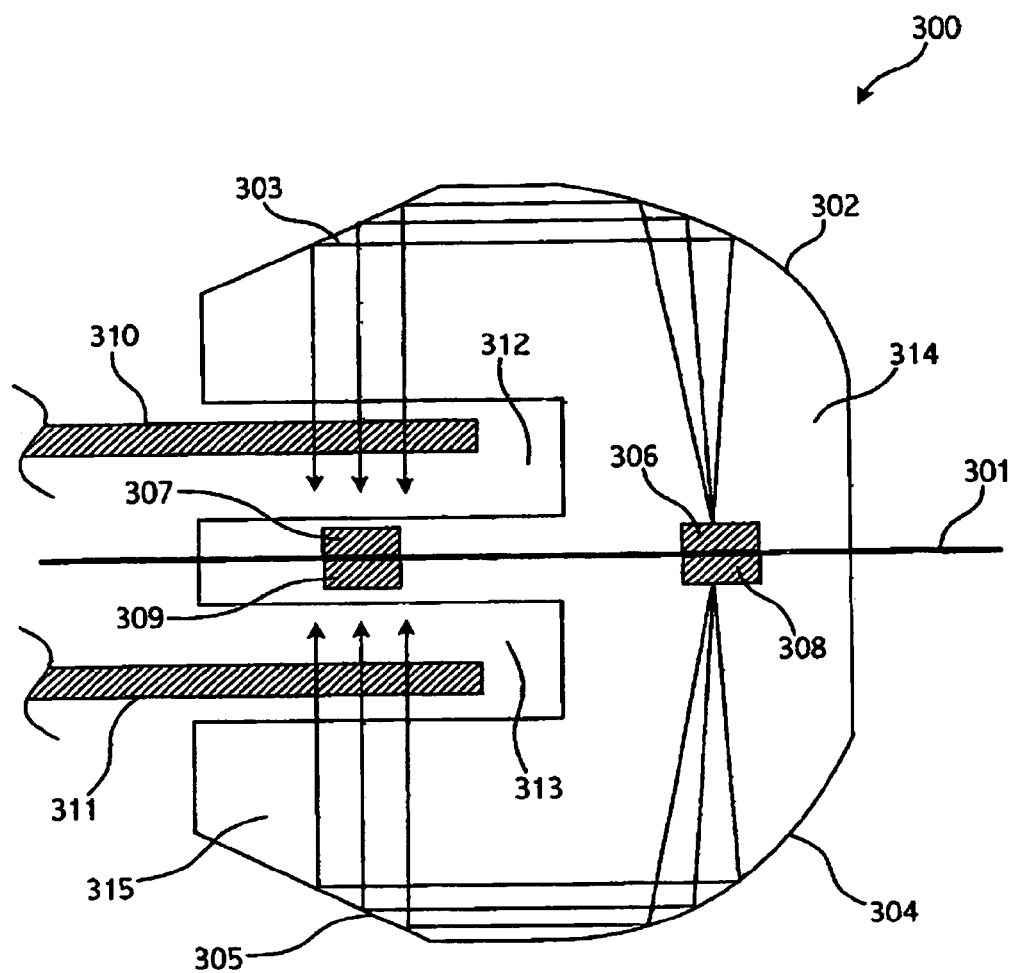
FIG. 3 shows a cross-section through a dual-axis optical encoder device according to the preferred embodiment of the invention.

The dual-axis optical encoder device according to the preferred embodiment is shown in FIG. 3.

In the optical encoder device 300 according to the preferred embodiment of the invention, a first optical emitter 306 and a first optical detector 307 are mounted directly on the first surface of the leadframe 301. A second optical emitter 308 and a second optical detector 309 are mounted directly on the second surface of the leadframe 301 and the optical emitter 308 and the optical detector 309 of the second encoder are arranged such that they are in parallel direction with the first optical emitter 306 and detector 307 of the first optical encoder. Also, the first optical emitter 306 and optical detector 307 on the first surface of the leadframe 301 are directly above the direction of the second optical emitter 308 and optical detector 309 which are on the second surface of the leadframe 301. The direction of the optical emitter and optical detector pair is defined as the line intersecting both the optical emitter and the optical detector.

A first optical element 314 is provided for the first optical encoder on the first surface of the leadframe 301. The first optical element 314 is a three-dimensional epoxy-filled encapsulation which encapsulates the first optical emitter 306 and the optical detector 307 on the first surface of the leadframe 301. The first optical element 314 has a first surface 302 and a second surface 303 facing each other. The first surface 302 has a three-dimensional parabolic form and the second surface 303 is flat and arranged at an angle of 45° with respect to the direction of the light emitted from the first optical emitter 306 to the first surface 302. The first surface 302 is arranged above the first optical emitter 306, and the second surface 303 is arranged above the first optical detector 307.

Light is emitted by the first optical emitter 306 in the direction towards the first surface 302 of the first optical element 314 and travels along an optical path towards the first optical detector 307. The light emitted by the first optical emitter 306 travels along the optical path to the first surface 302, and is reflected and collimated by the first surface 302 to the second surface 303. The second surface 303 reflects the light to the first optical detector 307. Therefore, the optical path of the light from the first emitter 306 to the first optical detector 307 is substantially U-shaped, with the first and second surfaces 302, 303 of the first optical element 314 acting as internal reflecting surfaces.

A free area 312 is arranged inside the first optical element 314 between the second surface 303 and the first optical detector 307 and a codewheel/codestrip 310 is accommodated within the free area 312. The codewheel/codestrip 310 comprises a plurality of alternating transparent and opaque encoding elements in a form of slots and bars (not shown), which encoding elements are arranged such that they are able to affect the optical path of the light emitted by the first optical emitter 306 passing through the free area 312 in the first optical element 314. The codewheel/codestrip 310 moves or rotates in the free area 312 in a manner such that the encoding elements on the codewheel/codestrip 310 advances in a direction substantially orthogonal to the direction of the first optical emitter 306 and detector 307 pair of the first optical encoder.

The light emitted by the first optical emitter 306 therefore travels along the optical path in the optical element 314 towards the first surface 302, and is reflected and collimated by the first surface 302 into a parallel light beam towards the second surface 303. The second surface 303 reflects the parallel light beam into the free area 312 and onto the encoding elements of the codewheel/codestrip 310. Part of the parallel light beam passes through the transparent portion of the encoding elements on the codewheel/codestrip 310 and travels toward the first optical detector 307, and is subsequently detected by the first optical detector 307.

To ensure a complete reflection at the first and second surfaces 302, 303 of the first optical element 314, the first and second surfaces 302, 303 may be coated with reflective material to make the first optical element 314 less susceptible to manufacturing inaccuracies or fluctuations of the light emission direction during the operation of the first optical emitter 306, and therefore, prevents an undesired light loss at these two surfaces 302, 303.

A second optical element 315 is provided for the second optical encoder on the second surface of the leadframe 301. The second optical element 315 is a three-dimensional epoxy-filled encapsulation which encapsulates the second optical emitter 308 and the second optical detector 309 on the second surface of the leadframe 301. The second optical element 315 has a first surface 304 and a second surface 305 facing each other. The first surface 304 has a three-dimensional parabolic form and the second surface 305 is flat and arranged at an angle of −45° with respect to the direction of the light emitted from the second optical emitter 308 to the first surface 304 of the second optical element 315. The first surface 304 of the second optical element 315 is arranged below the second optical emitter 308, and the second surface 305 is arranged below the second optical detector 309.

Light is emitted by the second optical emitter 308 in the direction towards the first surface 304 of the second optical element 315 and travels along an optical path towards the second optical detector 309. The light emitted by the second optical emitter 308 travels along the optical path to the first surface 304 of the second optical element 315, and is reflected and collimated by the first surface 304 to the second surface 305. The second surface 305 reflects the light to the second optical detector 309. Therefore, the optical path of the light from the second optical emitter 308 to the second optical detector 309 is also substantially U-shaped, with the first and second surfaces 304, 305 of the second optical element 315 acting as internal reflecting surfaces.

A free area 313 is arranged inside the second optical element 315 between the second surface 305 and the second optical detector 309 and a codewheel/codestrip 311 is accommodated within the free area 313. The codewheel/codestrip 311 comprises a plurality of alternating transparent and opaque encoding elements in a form of slots and bars (not shown), which encoding elements are arranged such that they are able to affect the optical path of the light emitted by the second optical emitter 308 passing through the free area 313 in the second optical element 315. The codewheel/codestrip 311 moves or rotates in the free area 313 in a manner such that the encoding elements on the codewheel/codestrip 311 advances in a direction substantially orthogonal to the direction of the second optical emitter 308 and detector 309 pair of the second optical encoder.

The light emitted by the second optical emitter 308 therefore travels along the optical path in the second optical element 315 towards the first surface 304, and is reflected and collimated by the first surface 304 into a parallel light beam towards the second surface 305. The second surface 305 reflects the parallel light beam into the free area 313 and onto the encoding elements of the codewheel/codestrip 311. Part of the parallel light beam passes through the transparent portion of the encoding elements on the codewheel/codestrip 311 and travels toward the second optical detector 309, and is subsequently detected by the second optical detector 309.

To ensure a complete reflection at the first and second surfaces 304, 305 of the second optical element 315, the first and second surfaces 304, 305 of the second optical element 315 may also be coated with reflective material to make the second optical element 315 less susceptible to manufacturing inaccuracies or fluctuations of the light emission direction during the operation of the second optical emitter 308, and therefore, prevents an undesired light loss at these two surfaces 304, 305.

Figure 4:
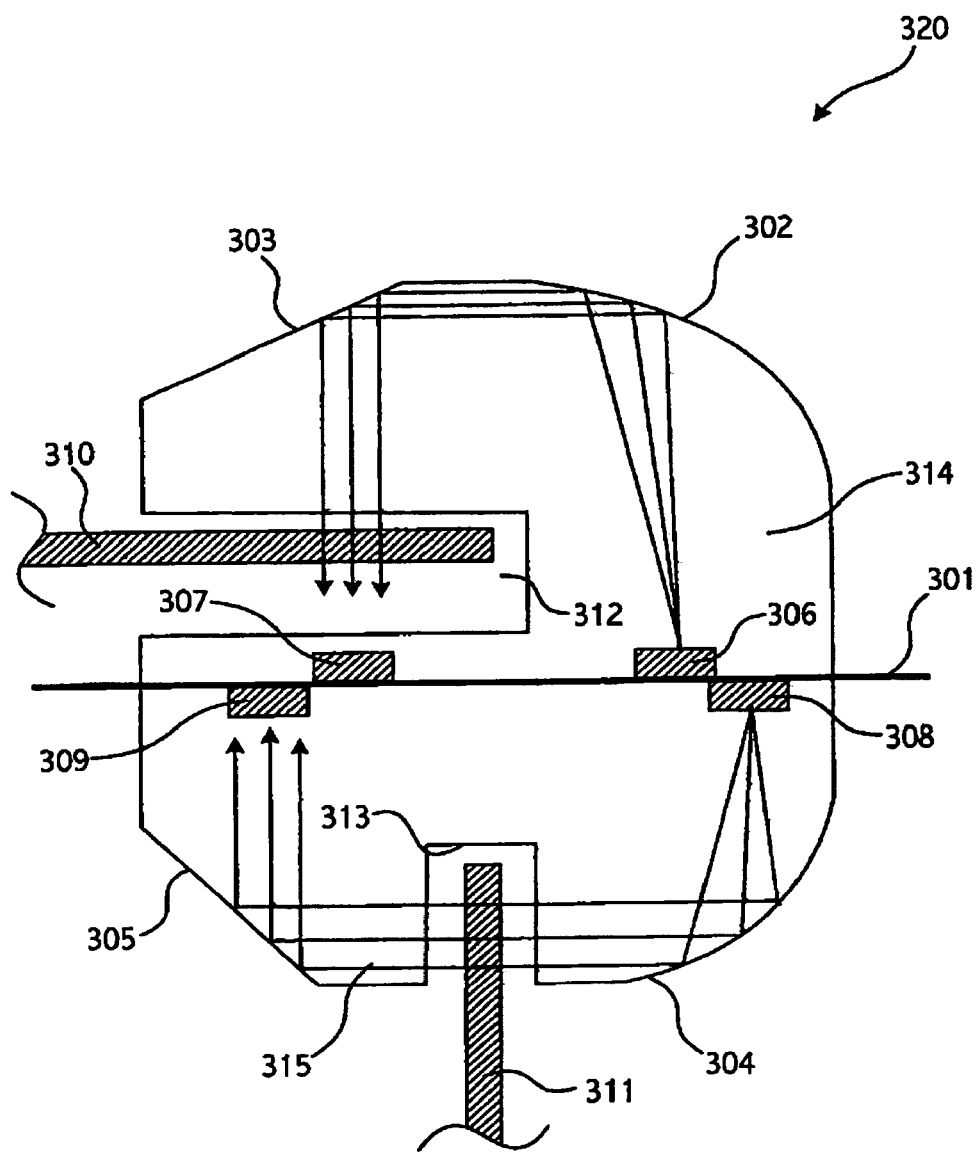
FIG. 4 shows a cross-section through a dual-axis optical encoder device according to the first alternative embodiment of the invention.

FIG. 4 shows a first alternative embodiment of the invention. The optical encoder device 320 in the first alternative embodiment is identical to the optical encoder 300 according to the preferred embodiment described in FIG. 3, except that the free area 313 of the second optical encoder in this alternative embodiment is provided between the first surface 304 and the second surface 305. In this case, the light emitted by the second optical emitter 308 therefore travels along the optical path in the second optical element 315 towards the first surface 304, and is reflected and collimated by the first surface 304 into a parallel light beam into the free area 313 and onto the encoding elements of the codewheel/codestrip 311. Part of the parallel light beam passes through the transparent portion of the encoding elements on the codewheel/codestrip 311 and travels towards the second surface 305, and is reflected by the second surface 305 to the second optical detector 309 to be detected.

The first alternative embodiment described in FIG. 4 above is suitable when it is more convenient to arrange at least one of the codewheel/codestrip of the first and second optical encoders in a different orientation from the preferred embodiment in FIG. 3.

Figure 1:
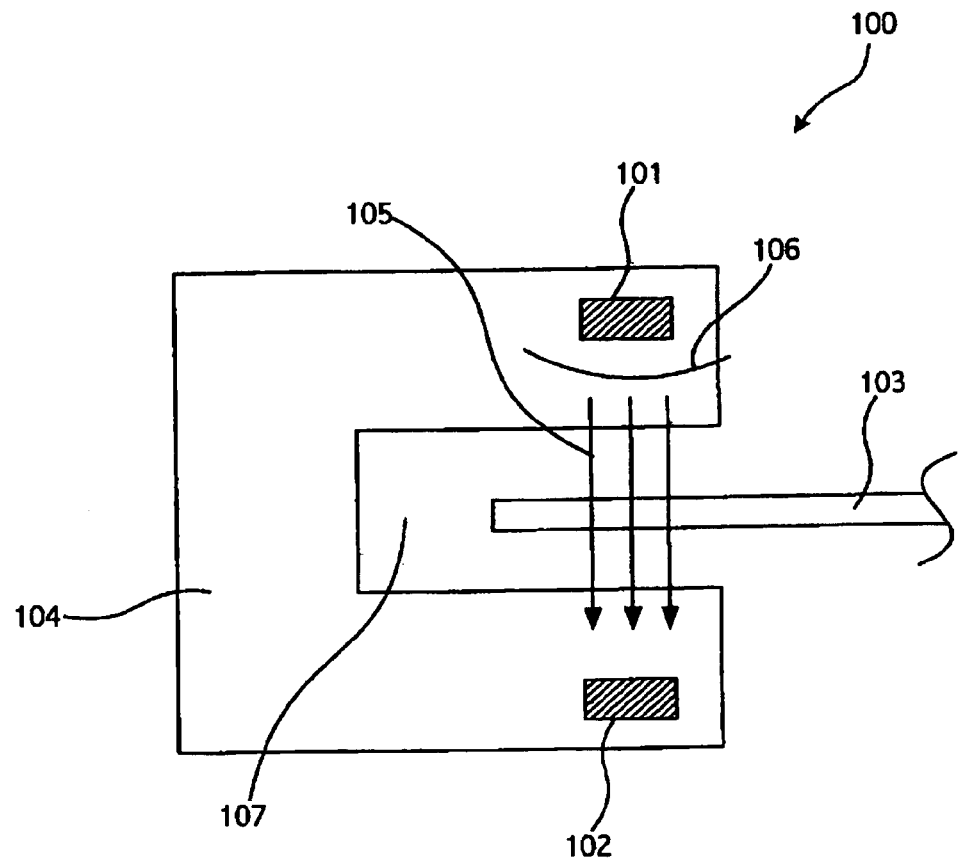
FIG. 1 shows a cross-section through a typical transmission-based optical encoder.
Figure 2:
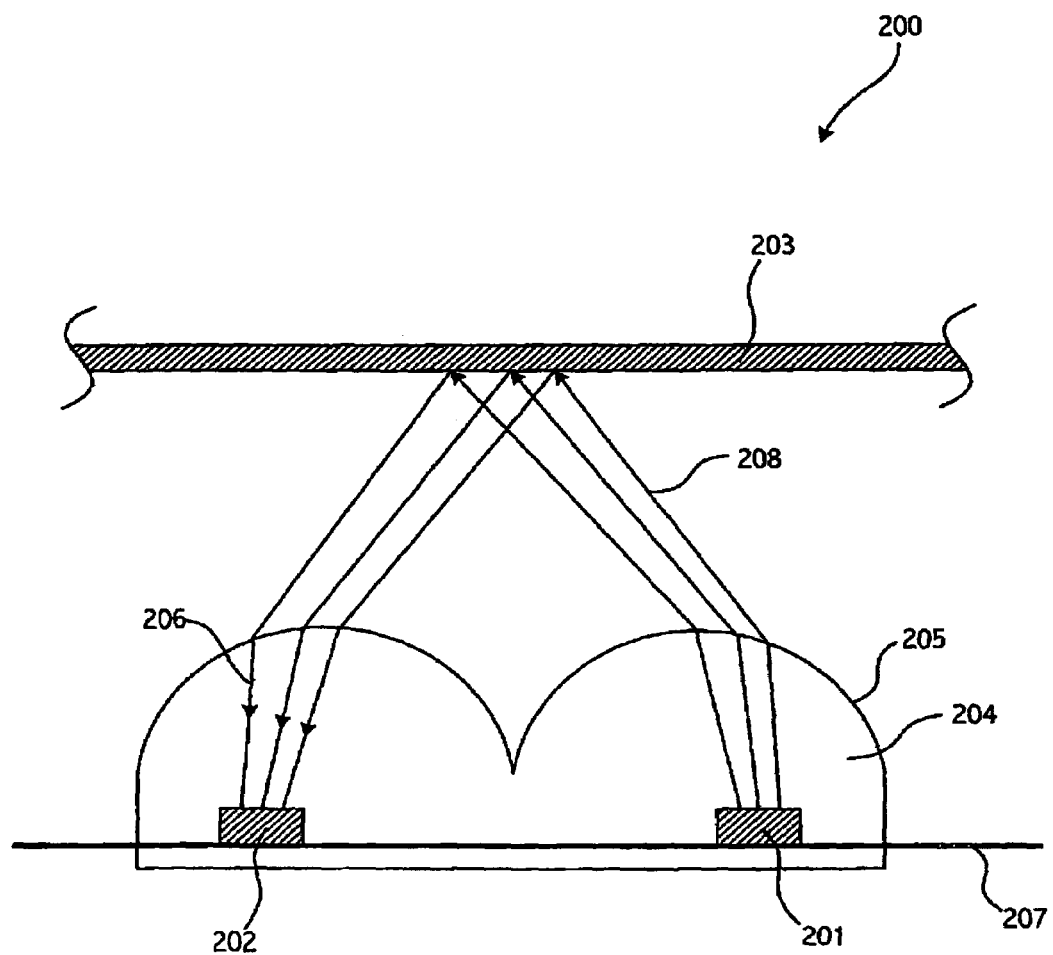
FIG. 2 shows a cross-section through a typical reflection-based optical encoder.

It should be pointed out again that the dual-axis optical encoder device according to the invention allows the flexibility of using the reflection-based encoder described in FIG. 2 as at least one of the first optical encoder and second optical encoder as alternative embodiments.

Figure 5:
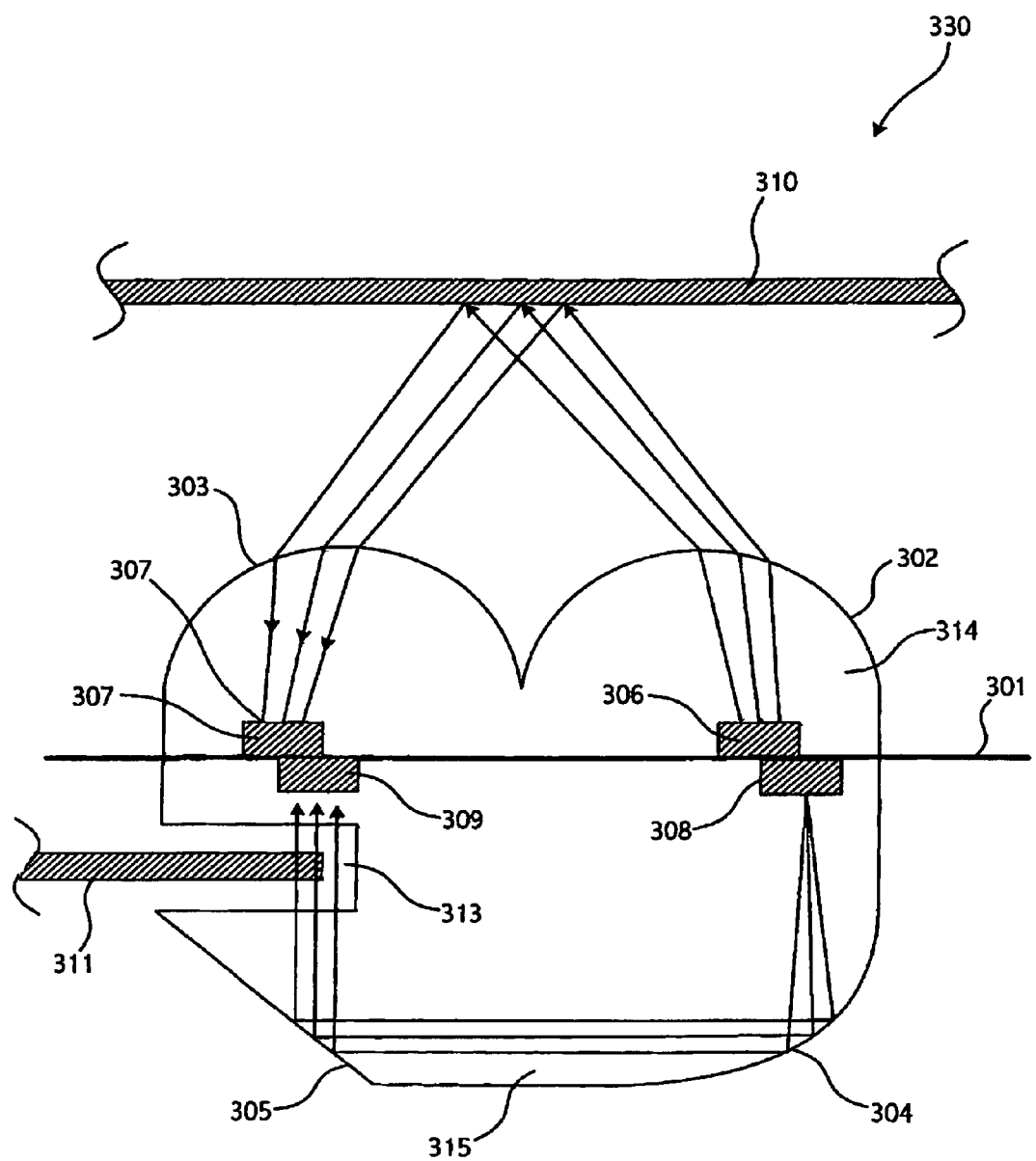
FIG. 5 shows a cross-section through a dual-axis optical encoder device according to the second alternative embodiment of the invention.

FIG. 5 shows a cross section through a dual-axis optical encoder device according to a second alternative embodiment of the invention, wherein the reflection-based optical encoder described in FIG. 2 is used as the first optical encoder.

In the optical encoder device 330 according to the second alternative embodiment of the invention, the first optical emitter 306 and the first optical detector 307 are mounted on the first surface of the leadframe 301, and the second optical emitter 308 and a second optical detector 309 are mounted on the second surface of the leadframe 301. The arrangement of the first and second optical emitters 306, 308 and detectors 307, 309 on the leadframe 301 are the same as the arrangement in the preferred embodiment of the invention as described in FIG. 3.

The first optical element 314 provided for the first optical encoder in this embodiment is also a three-dimensional epoxy-filled encapsulation over the first optical emitter 306 and the optical detector 307 on the first surface of the leadframe 301. However, the first optical element 314 in this embodiment has a first three-dimensional dome-shaped surface 302 and a second dome-shaped surface 303 arranged adjacent to each other, and directly over the first optical emitter 306 and the first optical detector 307 respectively. The first dome-shaped surface 302 acts as a light concentrator or collimator for light emitted by the first optical emitter 306 and the second dome-shaped surface 303 serves to converge a reflected light beam onto the first optical detector 307. The codewheel/codestrip 310 is arranged outside the first optical element 314, such that the two dome-shaped surfaces 302, 303 are between the codewheel/codestrip 310 and the leadframe 301.

The light emitted by the first optical emitter 306 travels in the optical path in the first optical element 314 towards the first dome-shaped surface 302 and is concentrated or collimated by the first dome-shaped surface 302 into an at least substantially parallel light beam. The at least substantially parallel light beam travels toward the codewheel/codestrip 310 and depending on the encoding elements on the codewheel/codestrip 310, a part of the at least substantially parallel light beam is reflected towards the second dome-shaped surface 303 of the first optical element 314. The reflected parallel light beam enters the second optical element 314 through the second dome-shaped surface 303 and is converged by the second dome-shaped surface 303 onto the optical detector 307. As can be seen, the optical path of the light for the first optical encoder is substantially V-shaped.

The second optical encoder in this alternative embodiment is identical to the second optical encoder in the preferred embodiment as described in FIG. 3, and will not be described again.

Figure 6:
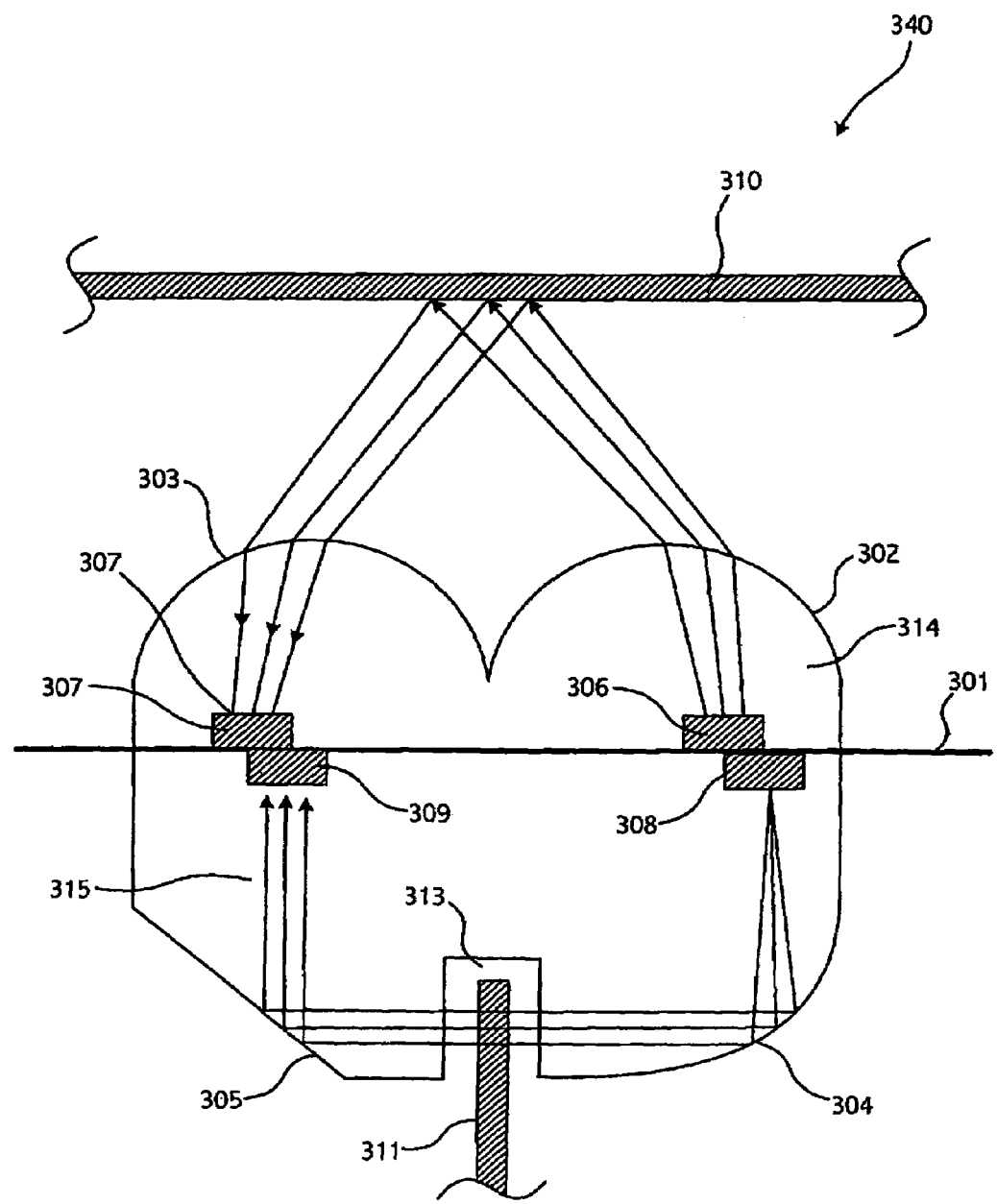
FIG. 6 shows a cross-section through a dual-axis optical encoder device according to the third alternative embodiment of the invention.

FIG. 6 shows a cross-section of a dual-axis optical encoder device 340 according to a third alternative embodiment of the invention.

The arrangement of the optical encoder device 340 is similar to the optical encoder device 330 described in FIG. 5, except that the free area 313 of the second optical encoder of the optical encoder device 340 is provided between the first surface 304 and the second surface 305.

The other parts of the optical encoder device 340 are identical to the optical encoder device 330 in the second alternative embodiment described in FIG. 5, and will not be described again.

Figure 7:
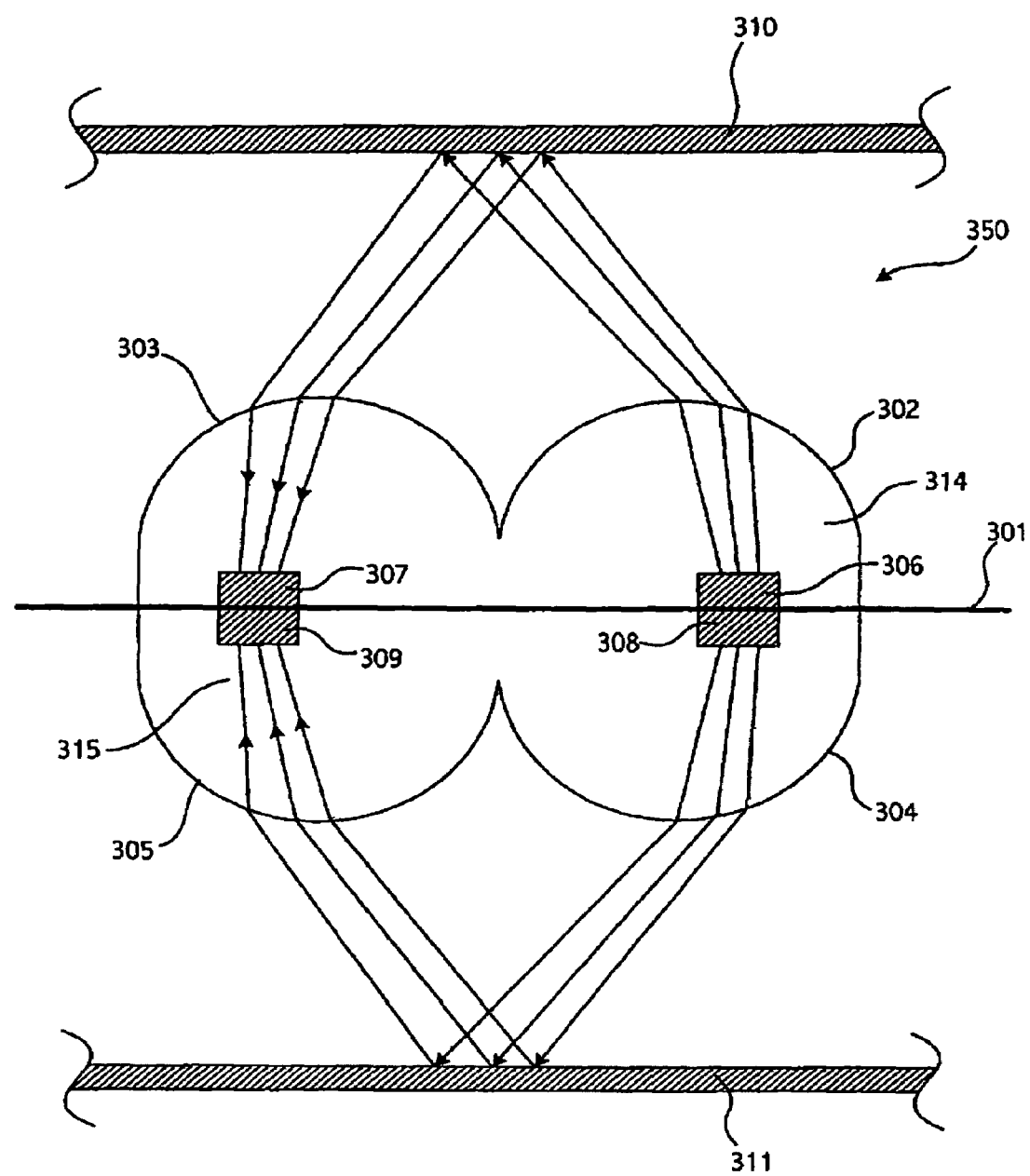
FIG. 7 shows a cross-section through a dual-axis optical encoder device according to the fourth alternative embodiment of the invention.

FIG. 7 shows a cross-section of a dual-axis optical encoder device 350 according to a fourth alternative embodiment of the invention.

The dual-axis optical encoder device 350 uses the reflection-based optical encoder described in FIG. 2 for the first and the second optical encoders on both the first surface and the second surface of the leadframe 301.

The second optical element 315 provided for the second optical encoder in this embodiment is also provided as a three-dimensional epoxy-filled encapsulation over the second optical emitter 308 and the second optical detector 309 on the second surface of the leadframe 301. The second optical element 315 in this embodiment has a first three-dimensional dome-shaped surface 304 and a second dome-shaped surface 305 arranged adjacent to each other, and directly below the second optical emitter 308 and the second optical detector 309 respectively. The first dome-shaped surface 304 acts as a light concentrator or collimator for light emitted by the second optical emitter 308 and the second dome-shaped surface 305 serves to converge a reflected light beam onto the second optical detector 309. The codewheel/codestrip 311 is arranged outside the second optical element 315, such that the two dome-shaped surfaces 304, 305 are between the codewheel/codestrip 311 and the leadframe 301.

The light emitted by the second optical emitter 308 travels in the optical path in the second optical element 315 towards the first dome-shaped surface 304 and is concentrated or collimated by the first dome-shaped surface 304 into an at least substantially parallel light beam. The at least substantially parallel light beam travels toward the codewheel/codestrip 311 and depending on the encoding elements on the codewheel/codestrip 311, a part of the at least substantially parallel light beam is reflected towards the second dome-shaped surface 305 of the second optical element 315. The reflected parallel light beam enters the second optical element 315 through the second dome-shaped surface 305 and is converged by the second dome-shaped surface 305 onto the optical detector 309. The optical path of the light for the first optical encoder is substantially V-shaped.

Figure 8:
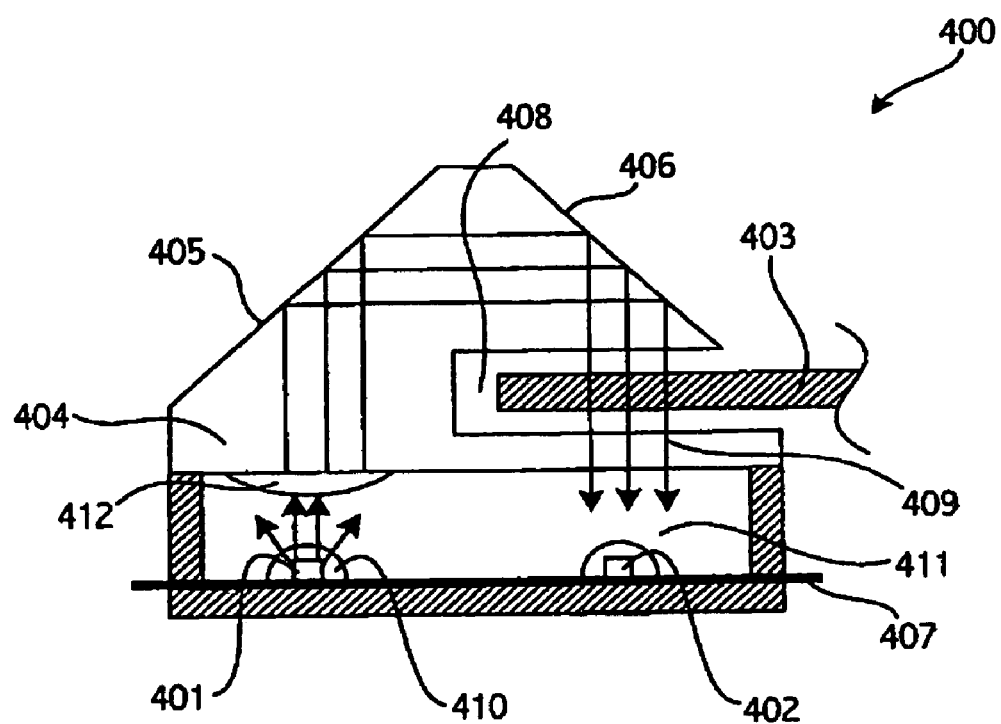
FIG. 8 shows a cross-section through an optical encoder mounted on an insert-molded leadframe with the free area accommodated between the second flat surface and the optical detector.
Figure 9:
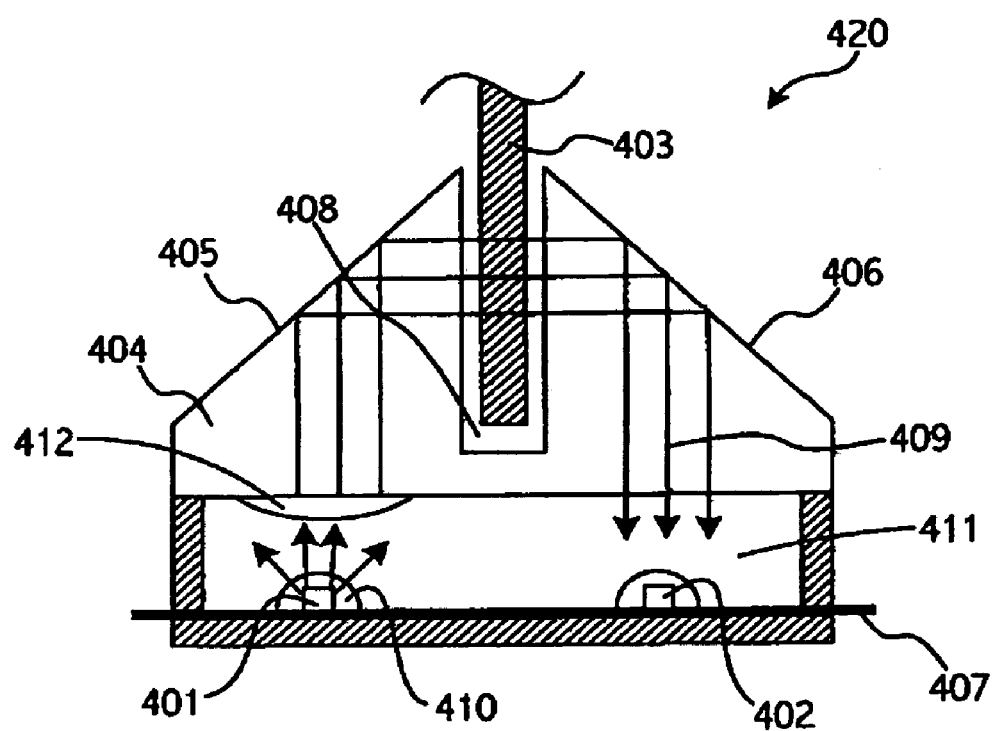
FIG. 9 shows a cross-section through an optical encoder mounted on an insert-molded leadframe with the free area accommodated between the first and the second flat surface.

Further alternative embodiments can be derived by replacing at least one of the first and second optical encoders of the described embodiments with the optical encoders shown in FIG. 8 or FIG. 9.

FIG. 8 shows an optical encoder for use in further alternative embodiments of the invention.

The optical encoder 400 comprises an insert-molded leadframe 407, an optical emitter 401, an optical detector 402, an optical element 404 and an optical lens 412. The optical element 404 in this case is arranged directly on the insert-molded leadframe 407 and encloses an air gap 411. Hence it does not encapsulate the optical emitter 401 and the optical detector 402. The optical emitter 401 and the optical detector 402 are each enclosed in an encapsulation capsule 410 and are arranged on the insert-molded leadframe 407 in the air gap 411. The optical element 404 has a first flat surface 405 and a second flat surface 406, wherein the first flat surface 405 is arranged above the optical emitter 401, and the second flat surface is arranged above the optical detector 402. The optical emitter 401 emits light in the direction towards the first flat surface 405, and the optical detector 402 detects light from the direction of the second flat surface 406. The optical lens 412 is arranged in the air gap 411, in the path of the light emitted by the optical emitter 401 to collimate the emitted light into a parallel light beam. The light, which is emitted by the optical emitter 401, travels along optical path 409 inside the optical element 404 towards the optical detector 402.

The first flat surface 405 encloses a first angle of −45° with respect to the direction of the light emitted by the optical emitter 401, and faces both the optical emitter 401 and the second flat surface 406. The second flat surface 406 encloses a second angle of +45° with respect to the direction of the light emitted by the optical emitter 401, and faces both the optical detector 402 and the first flat surface 405.

A free area 408 is arranged inside the optical element 404 between the second flat surface 406 and the optical detector 402, and a codewheel/codestrip 403 is accommodated within the free area 408.

The first flat surface 405 and the second flat surface 406 act as internal reflecting surfaces, so that light incident on the surfaces is reflected. The light emitted by the optical emitter 401 is collimated into parallel light by the optical lens 412 and travels along the optical path 409 in the optical element 404. The parallel light is reflected by the first flat surface 405 towards the second surface 406, and is again reflected by the second surface 406 into the free area 408. Part of the parallel light which is transmitted through the transparent encoding elements of the codewheel/codestrip 403 travels towards the optical detector 402 and is subsequently detected by the optical detector 402. The optical path of the light emitted by the optical emitter 401 is substantially U-shaped.

FIG. 9 shows a cross-section of another optical encoder which can be used in at least one alternative embodiment of the invention. The optical encoder 420 in FIG. 9 is similar to the optical encoder 400 shown in FIG. 8, except that the free area 408 is arranged in the optical element 404 between the first flat surface 405 and the second flat surface 406.

When any of the optical encoders shown in FIG. 8 or FIG. 9 are used in the dual-axis encoder device according to the invention, an inserted-mold leadframe 407 as shown in FIG. 8 or FIG. 9 is used instead of the leadframe 301 as used in the preferred embodiment shown in FIG. 3.

The dual-axis optical encoder device according to the invention also provides the flexibility of allowing the optical emitter-detector pair of the first optical encoder and the second encoder to be arranged on the substrate in different directions with respect to each other. Such arrangement, although compromising on the compactness of the device, is necessary for example when the circuitries on the substrate are arranged such that the first and second optical encoders are not able to be arranged in the same direction.

Figure 10:
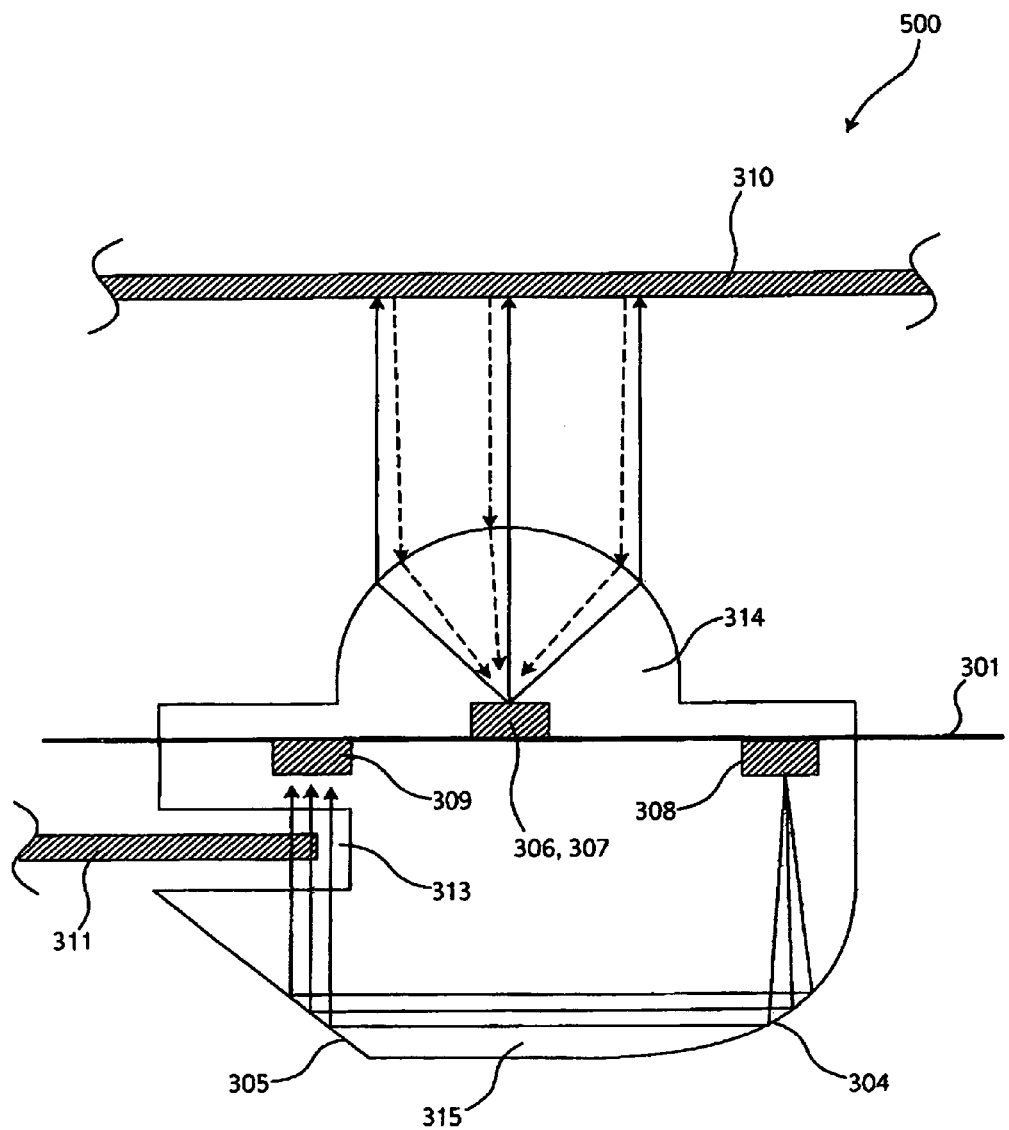
FIG. 10 shows a cross-section through a dual-axis optical encoder device according to the invention, with the first optical encoder arranged orthogonal to the second optical encoder.

FIG. 10 shows a cross-section of a dual-axis optical encoder 500 when the first optical emitter 306 and the first optical detector 307 of the first optical encoder belonging to the dual-axis optical encoder 330 in FIG. 5 are arranged in a direction orthogonal to the direction of the second optical emitter 308 and optical detector 309 of the second optical encoder. The parts and operation of the dual-axis optical encoder device 500 are identical to the dual-axis optical encoder device 330 described in FIG. 5. It should be noted that the orientation of the codewheel/codestrip 310 for the first optical encoder need not be changed even though the orientation of the first optical encoder is changed. This is because the encoding elements on the codewheel/codestrip 310 are still able to affect the optical path. However, the orientation of the photodiodes used in the optical detector 307 needs to be changed (not shown) correspondingly in order to detect the pattern of the light reflected by the codewheel/codestrip 310.

The dual-axis optical encoder device according to the above described embodiments can thus be used to provide feedback information of a dual-axis encoding application, for example the position of the cursor controlled by a mouse of a computer. In this example, the codewheel/codestrip 310 of the first optical encoder can be used to provide feedback information on the movement of the mouse along one axis, for example the X-axis, and the codewheel/codestrip 311 of the second optical encoder can be used to provide feedback information on the movement of the mouse along another axis, for example the Y-axis. In this way, the movement and hence the new position of the cursor on the X-Y axis can be determined, without having to use two separate optical encoders.

The optical emitter used according to the invention is a light emitting diode, and the optical detector is an array of photodiodes strips. The first and/or second optical encoders further comprises a signal processor for processing the signals which are generated by the optical detector on the basis of movement of the codewheel/codestrip.

While the described embodiments of the invention have been described, they are merely illustrative of the principles of the invention. Other embodiments and configurations, including the various combinations and orientations of the optical encoders, may be devised without departing from the spirit of the invention and the scope of the appended claims.

What is claimed is:

1. An optical encoder device, comprising:
   a substrate having a first surface and a second surface opposite the first surface; and
   a first optical encoder on the first surface of a substrate and a second optical encoder on the second surface of the substrate, wherein an optical emitter and an optical detector of the first optical encoder are mounted on the first surface of the substrate and an optical emitter and an optical detector of the second optical encoder are mounted on the second surface of the substrate.

2. The optical encoder device according to claim 1, wherein the optical emitter and optical detector pair of the first optical encoder define a first direction and the optical emitter and optical detector pair of the second optical encoder define a second direction, and wherein the first optical encoder and the second optical encoder are mounted such that the first direction and the second direction are parallel.

3. The optical encoder device according to claim 1, wherein the optical emitter and the optical detector of the first optical encoder define a first direction and the optical emitter and the optical detector of the second optical encoder define a second direction, and wherein the first optical encoder and the second optical encoder are mounted such that the first direction and the second direction are orthogonal.

4. The optical encoder device comprising:
   a first optical encoder on a first surface of a substrate and a second optical encoder on a second surface of the substrate, wherein an optical emitter and an optical detector of the first optical encoder and an optical emitter and optical detector of the second optical encoder are mounted on the first surface and the second surface of the substrate, respectively;
   wherein the optical emitter and optical detector pair of the first optical encoder define a first direction and the optical emitter and optical detector pair of the second optical encoder define a second direction, and wherein the first optical encoder and the second optical encoder are mounted such that the first direction and the second direction are parallel; and
   wherein the optical emitter and optical detector of the first optical encoder is are arranged on the first surface of the substrate above the optical emitter and optical detector of the second optical encoder on the second surface of the substrate.

5. The optical encoder device according to claim 4, wherein at least one of the first optical encoder and the second optical encoder includes an optical element for controlling an optical pat of the light emitted by the optical emitter to the optical detector of at least one of the first optical encoder and the second optical encoder.

6. The optical encoder device according to claim 5, wherein the optical element comprises a first surface and a second surface facing each other, the first and second surfaces acting as internal reflecting surfaces for light emitted by the corresponding optical emitter, such that the optical path of light emitted by the optical emitter is substantially U-shaped.

7. The optical encoder device according to claim 6, wherein the first surface has a parabolic form and collimates light emitted by a corresponding one of the optical emitters into parallel light, and wherein the second surface is flat and encloses an angle of 45° with respect to the direction of the light emitted by the optical emitter.

8. The optical encoder device according to claim 7, wherein a free area is provided in the optical element between the second surface and the optical detector.

9. The optical encoder device according to claim 7, wherein a free area is provided in the optical element between the first surface and the second surface.

10. The optical encoder device according to claim 6, wherein the first and second surfaces are flat, and wherein the first and second surfaces enclose an angle of −45° and +45°, respectively, with respect to the direction of the light emitted by the corresponding optical emitter.

11. The optical encoder device according to claim 10, further comprising a lens adjacent to the corresponding optical emitter, collimating light emitted by the optical emitter into parallel light.

12. The optical encoder device according to claim 5, wherein the optical element comprises a first surface and a second surface shaped in a form of a dome facing in a same direction, wherein the first surface concentrates light emitted by the corresponding optical emitter, and wherein the second surface is able to converge light onto the corresponding optical detector.

* * * * *